United States Patent
Huang et al.

(10) Patent No.: US 10,612,525 B2
(45) Date of Patent: Apr. 7, 2020

(54) LIGHTNING PROTECTION DEVICE, DIRECT-DRIVE WIND TURBINE GENERATOR SYSTEM AND LIGHTNING PROTECTION METHOD THEREOF

(71) Applicant: BEIJING GOLDWIND SCIENCE & CREATION WINDPOWER EQUIPMENT CO., LTD., Daxing, Beijing (CN)

(72) Inventors: Jinpeng Huang, Beijing (CN); Chengqian Liu, Beijing (CN)

(73) Assignee: BEIJING GOLDWIND SCIENCE & CREATION WINDPOWER, Beijing (CN)

( * ) Notice: Subject to any disclaimer, the term of this patent is extended or adjusted under 35 U.S.C. 154(b) by 886 days.

(21) Appl. No.: 15/033,396

(22) PCT Filed: Nov. 19, 2014

(86) PCT No.: PCT/CN2014/091713
§ 371 (c)(1),
(2) Date: Apr. 29, 2016

(87) PCT Pub. No.: WO2015/074576
PCT Pub. Date: May 28, 2015

(65) Prior Publication Data
US 2016/0273521 A1    Sep. 22, 2016

(30) Foreign Application Priority Data
Nov. 22, 2013    (CN) .......................... 2013 1 0597395

(51) Int. Cl.
*F03D 80/30*    (2016.01)
(52) U.S. Cl.
CPC ............ *F03D 80/30* (2016.05); *Y02E 10/725* (2013.01)

(58) Field of Classification Search
CPC . F03D 80/30; F03D 9/002; F03D 9/25; Y02E 10/725
(Continued)

(56) References Cited

U.S. PATENT DOCUMENTS

| | | | |
|---|---|---|---|
| 6,932,574 B2 * | 8/2005 | Wobben | F03D 1/065 416/146 R |
| 7,377,750 B1 * | 5/2008 | Costin | F03D 80/30 361/220 |

(Continued)

FOREIGN PATENT DOCUMENTS

| | | |
|---|---|---|
| CN | 101341334 A | 1/2009 |
| CN | 201916132 U | 8/2011 |

(Continued)

OTHER PUBLICATIONS

International Search Report dated Feb. 11, 2015: PCT/CN2014/091713.

(Continued)

*Primary Examiner* — David E Sosnowski
*Assistant Examiner* — Wayne A Lambert
(74) *Attorney, Agent, or Firm* — Ladas & Parry LLP (57) ABSTRACT

A lightning protection device includes a lightning arrester arranged on a nonmetallic blade and configured to receive a lightning current, and a blade down lead electrically connected to the lightning arrester. The lighting protection device further includes: a first lightning current conducting component, electrically connected to the blade down lead and connected to an outer surface of a generator rotor in an insulation manner; a second lightning current conducting component, connected to the outer surface of the generator rotor and an insulated nacelle cover in insulation manner, and electrically connected to the first lightning current conducting component via a metal conductor; and a light- (Continued)

ning protection down lead, configured to electrically connect the second lightning current conducting component and a grounding component arranged inside a tower, to discharge the lightning current to ground through the tower.

13 Claims, 5 Drawing Sheets

(58) Field of Classification Search
USPC .......................................................... 416/39
See application file for complete search history.

(56) References Cited

U.S. PATENT DOCUMENTS

| | | | | |
|---|---|---|---|---|
| 7,390,169 | B2* | 6/2008 | Larsen | H02G 13/00 416/146 R |
| 8,081,414 | B2* | 12/2011 | Llorente Gonzalez | F03D 1/065 361/220 |
| 8,191,255 | B2* | 6/2012 | Kristensen | F03D 80/30 29/889.71 |
| 8,659,697 | B2 | 2/2014 | Casazza et al. | |
| 9,097,238 | B2* | 8/2015 | Lewke | F03D 80/80 |
| 9,181,927 | B2 | 11/2015 | Lewke et al. | |
| 9,334,852 | B2 | 5/2016 | Olsen | |
| 2003/0170122 | A1* | 9/2003 | Wobben | F03D 1/065 416/31 |
| 2004/0028528 | A1* | 2/2004 | Flemming | F03D 80/30 416/146 R |
| 2006/0013695 | A1* | 1/2006 | Pedersen | F03D 80/30 416/248 |
| 2008/0145229 | A1* | 6/2008 | Llorente Gonzalez | F03D 1/065 416/230 |
| 2009/0053062 | A1 | 2/2009 | Arinaga et al. | |
| 2009/0139739 | A1* | 6/2009 | Hansen | F03D 80/30 174/2 |
| 2011/0142671 | A1 | 6/2011 | Fritz et al. | |
| 2011/0198965 | A1* | 8/2011 | Krogh | H01R 39/08 310/227 |
| 2011/0305573 | A1* | 12/2011 | Olsen | F03D 80/30 416/146 R |
| 2012/0219420 | A1* | 8/2012 | Lewke | F03D 80/80 416/146 R |
| 2012/0269631 | A1 | 10/2012 | Lewke | |
| 2012/0282097 | A1* | 11/2012 | Lewke | F03D 80/30 416/146 R |
| 2013/0049734 | A1* | 2/2013 | Catchpole | H02G 13/00 324/72 |
| 2013/0149154 | A1 | 6/2013 | Kuroiwa et al. | |
| 2014/0348656 | A1 | 11/2014 | Huang et al. | |
| 2017/0356426 | A1* | 12/2017 | Nieuwenhuizen | F03D 80/30 |

FOREIGN PATENT DOCUMENTS

| | | |
|---|---|---|
| CN | 102652221 A | 8/2012 |
| CN | 102661240 A | 9/2012 |
| CN | 202431453 U | 9/2012 |
| CN | 102900630 A | 1/2013 |
| CN | 102918262 A | 2/2013 |
| CN | 103174603 A | 6/2013 |
| CN | 103603775 A | 2/2014 |
| CN | 203570513 U | 4/2014 |
| DE | 102007052525 A1 | 5/2009 |
| EP | 0718495 A1 | 6/1996 |
| EP | 1568883 A2 | 8/2005 |
| EP | 2395238 A1 | 12/2011 |
| EP | 2520796 A1 | 11/2012 |
| EP | 2789851 A1 | 10/2014 |
| KR | 20110135350 A | 12/2011 |
| WO | 2010/125160 A1 | 11/2010 |
| WO | 2013/084374 A1 | 6/2013 |
| WO | 2013/091380 A1 | 6/2013 |
| WO | WO-2013091380 A1 * | 6/2013 ............. H02G 13/80 |

OTHER PUBLICATIONS

The Extended European Search Report dated Jul. 18, 2017; Appln. 14863636.8-1603/3078852 PCT/CN2014091713.
Australian Examination Report No. 1 dated Nov. 25. 2016, Appln. No. 2014352342.
Chinese Office Action (First); dated Aug. 4, 2015; Appln. No. 201310597395.3.
Korean Office Action (First) dated Dec. 19, 2016; Appln. No. 10-2011-0135350.

* cited by examiner

LIGHTNING PROTECTION DEVICE, DIRECT-DRIVE WIND TURBINE GENERATOR SYSTEM AND LIGHTNING PROTECTION METHOD THEREOF

FIELD

The present application relates to the technical field of lightning protection devices, and in particular to a lightning protection device, a direct-driven wind turbine generator system and a lightning protection method for the direct-driven wind turbine generator system.

BACKGROUND

Wind turbine generator systems are usually constructed in open areas or coastal areas. A height of the wind turbine generator system generally exceeds 130 meters, particularly, the height of a new-type wind turbine generator system usually exceeds 160 meters, and the wind turbine generator system is a protruding object in these areas, thus the wind turbine generator system is easily struck by lightning.

Therefore, lightning protection for the wind turbine generator system is crucially important, especially for a direct-driven wind turbine generator system in which a generator is arranged outside of a nacelle. Since cost of a pitch bearing, a generator main bearing and a yaw bearing in a generator of the direct-driven wind turbine generator system occupies a large proportion in the total cost of the direct-driven wind turbine generator system, and a lightning current may cause the three types of bearings to burn and damage, thus the lightning protection for the direct-driven wind turbine generator system is particularly important.

Figure 1:
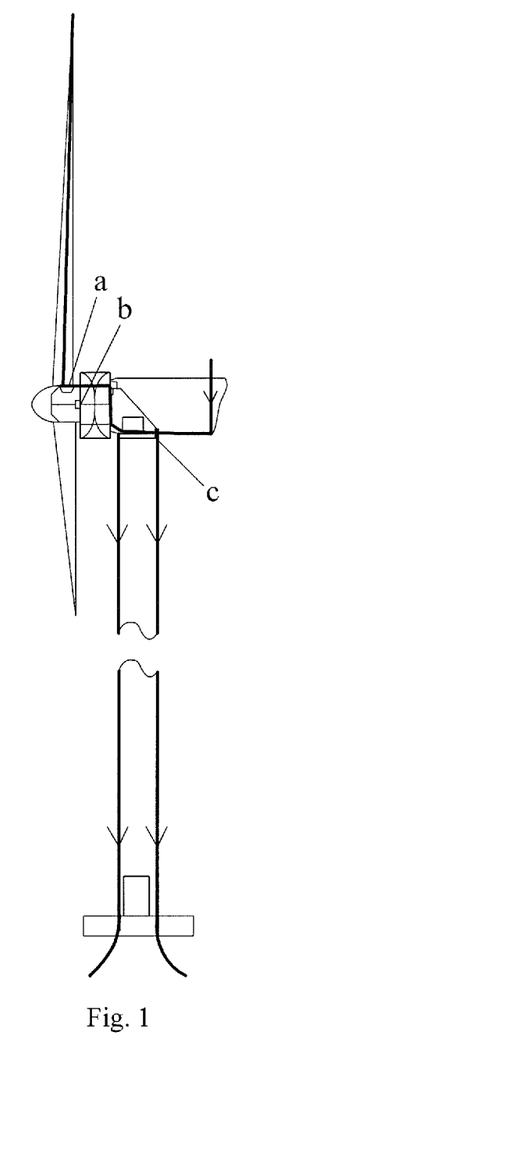
FIG. 1 is a schematic view showing a direct lightning current flowing path through a direct-driven wind turbine generator system in the conventional technology.

Currently, as shown in FIG. 1, a lightning protection method for the direct-driven wind turbine generator system includes arranging a separate cable lead in a blade, and taking a metal casting, a structural member and the bearings of the direct-driven wind turbine generator system as a conduction path for the direct lightning, that is, a down lead of a blade lightning arrester is connected to a flange at a root of the blade of the direct-driven wind turbine generator system, the flange at the root of the blade is connected to a wheel hub via the pitch bearing, the wheel hub is connected to the generator via the generator main bearing, the generator is connected to a base for the nacelle, the base for the nacelle is connected to a tower via the yaw bearing, and the tower is connected to an own structure of the direct-driven wind turbine generator system of a wind turbine base to discharge the direct lightning current. FIG. 1 is a schematic view showing a circulation path of a direct lightning current through a direct-driven wind turbine generator system in the conventional technology.

However, since there is a clearance between an inner race and an outer race of the bearing of the generator, impedance in the circulation path of the lightning current is high, which affects discharging of the lightning current. In addition, the bearings may be burned and then damaged by the lightning current in case of using the bearings as the circulation path of the lightning current, thereby increasing the total cost. Moreover, a normal operation of the direct-driven wind turbine generator system may be interrupted in the case that the generator is shut down to replace a new bearing, which further brings a huge economic loss.

A lightning protection method and a lightning protection device for the wind turbine generator system according to the conventional technology has constructed a lightning current discharging path, in which the lightning current flows from the blade, through a wheel hub cover and a nacelle cover, and then flows to the ground, thus allowing the lightning current to completely avoid flowing through the pitch bearing, and ensuring safety of the pitch bearing. However, other bearings such as the generator main bearing and the yaw bearing may still be damaged by the lightning current flowing through the bearings. In addition, although the lightning current discharging path only passes through the wheel hub cover and the nacelle cover, the lightning current may be shunted to the bearings, thereby damaging the bearings. Also, since the generator of the direct-driven wind turbine generator system is arranged outside of the direct-driven wind turbine generator system, the lightning protection issue for the generator can not be completely addressed with the above design.

SUMMARY

A lightning protection device, a direct-driven wind turbine generator system and a lightning protection method for the direct-driven wind turbine generator system are provided according to the embodiments of the present application, which can allow a lightning current flow along a new external channel instead of bearings of the direct-driven wind turbine generator system, thus avoiding the bearings from being damaged by the lightning current.

In order to achieve the above objects, the following technical solutions are provided according to the embodiments of the present application.

In one aspect, a lightning protection device is provided according to the present application, which includes a lightning arrester arranged on a nonmetallic blade and configured to receive a lightning current, and a blade down lead electrically connected to the lightning arrester, and the lighting protection device further includes:

a first lightning current conducting component, electrically connected to the blade down lead and connected to an outer surface of a generator rotor in an insulation manner;

a second lightning current conducting component, connected to the outer surface of the generator rotor and an insulated nacelle cover in insulation manner, and electrically connected to the first lightning current conducting component via a metal conductor; and a lightning protection down lead, configured to electrically connect to the second lightning current conducting component and a grounding component arranged inside a tower, to discharge the lightning current into the ground through the grounding component.

In another aspect, a direct-driven wind turbine generator system is provided according to the present application, which includes the lightning protection device according to the above technical solution.

In yet another aspect, a lightning protection method for a direct-driven wind turbine generator system is further provided according to the present application, where a generator of the direct-driven wind turbine generator system is arranged outside of a nacelle, the direct-driven wind turbine generator system includes the lightning protection device according to any one of the above technical solutions, and the lightning protection method for the direct-driven wind turbine generator system includes:

receiving a lightning current via the lightning arrester arranged on a wind turbine blade;

transmitting the lightning current to the first lightning current conducting component by connecting the blade down lead to the lightning arrester;

transmitting the lightning current from the first lightning current conducting component to the second lightning current conducting component by the metal conductor;

transmitting the lightning current from the second lightning current conducting component to the grounding component by the lightning protection down lead; and discharging the lightning current to ground by the grounding component.

In the lightning protection device, the direct-driven wind turbine generator system and the lightning protection method for the direct-driven wind turbine generator system according to the embodiments of the present application, a separate external current conducting channel is employed, to solve the design defects in the conventional direct lightning protection design that bearings are damaged in the case that the lightning current flows through the bearings, and a new separate lightning current discharging channel (from the lightning arrester through the blade down lead, the first lightning current conducting component, the nonmetallic conductor, the second lightning current conducting component, the lightning protection down lead, and the grounding component, to the ground) is constructed. In this case, the lightning current flows along the new channel instead of the bearings of the direct-driven wind turbine generator system, thereby effectively ensuring the normal operation of the bearings (including a yaw bearing, a pitch bearing and a generator main bearing) of the direct-driven wind turbine generator system, prolonging the service life of the bearings of the direct-driven wind turbine generator system, ensuring the normal operation of the direct-driven wind turbine generator system and greatly improving the electrical conductivity of the lightning current discharging channel.

BRIEF DESCRIPTION OF THE DRAWINGS

For more clearly illustrating embodiments of the present application or the technical solution in the conventional technology, drawings referred to describe the embodiments or the conventional technology will be briefly described hereinafter. Apparently, the drawings in the following description are only several embodiments of the present application, and for the person skilled in the art other drawings may be obtained based on these drawings without any creative efforts.

REFERENCE NUMBERS pitch bearing a, generator main bearing b, yaw bearing c, blade 1, blade down lead 2, first lightning current conducting component 3, arc-shaped electric brush track 31, first lightning protection electric brush 32, first insulating component 4, generator rotor 5, insulated nacelle cover 6, second lightning current conducting component 7, second lightning protection electric brush 71, annular electric brush track 72, second insulating component 8, metal conductor 9, tower 10, lightning protection down lead 11, first electric brush dust receiving box 12, second electric brush dust receiving box 13, yaw bearing 14, grounding component 15, and grounding ear plate 151.

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Figure 2:
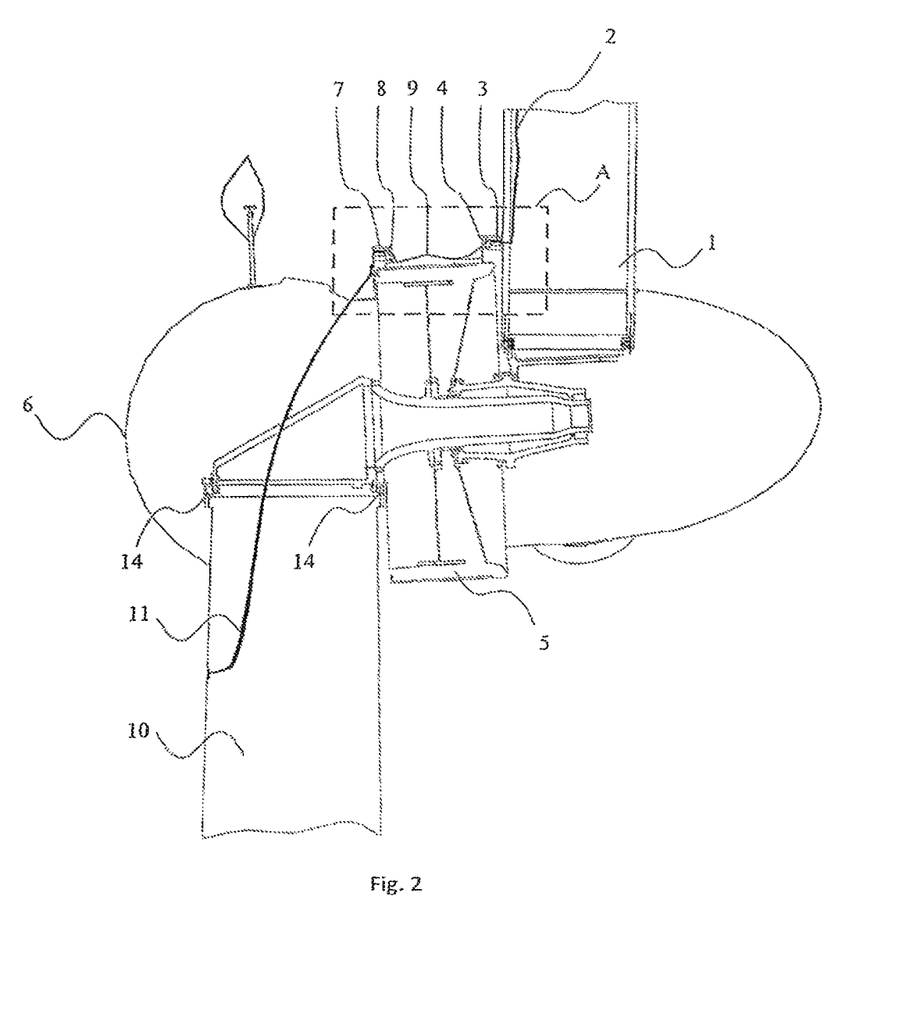
FIG. 2 is a schematic view showing the structure of a lightning protection device according to an embodiment of the present application.

As shown in FIG. 2, a lightning protection device for a direct-driven wind turbine generator system is provided according to an embodiment of the present application, which includes a lightning arrester (not shown in the drawing) arranged on a nonmetallic blade 1 and configured to receive a lightning current, and a blade down lead 2 electrically connected to the lightning arrester. The lightning protection device further includes a first lightning current conducting component 3 electrically connected to the blade down lead 2 and connected to an outer surface of a generator rotor 5 in insulation manner, a second lightning current conducting component 7, which is connected to an outer surface of the generator rotor 5 and an insulated nacelle cover 6 in insulation manner, and is electrically connected to the first lightning current conducting component 3 via a metal conductor 9, and a lightning protection down lead 11 electrically connected to the second lightning current conducting component 7, and a grounding component 15 (referring to FIG. 4) arranged in a tower 10 and configured to discharge the lightning current into the ground through the grounding component 15.

In the lightning protection device for the direct-driven wind turbine generator system shown in FIG. 2 according to the embodiment of the present application, a separate external current conducting channel is employed, to solve the design defect in the conventional direct lightning protection design that bearings are damaged in the case that the lightning current flows through the bearings, and a new lightning current discharging channel (from the lightning arrester, through the blade down lead 2, the first lightning current conducting component 3, the metal conductor 9, the second lightning current conducting component 7, the lightning protection down lead 11, and the grounding component 15, to the ground) is provided. In this case, the lightning current flows along the new external channel instead of the bearings of the direct-driven wind turbine generator system, thereby effectively ensuring the normal operation of the bearings (including a yaw bearing, a pitch bearing and a generator main bearing) of the direct-driven wind turbine generator system, prolonging a service life of the bearings of the direct-driven wind turbine generator system, and ensuring the normal operation of the direct-driven wind turbine generator system, and greatly improving the electrical conductivity of the lightning current discharging channel.

It should be noted that, direct-driven wind turbine generator system according to the embodiment of the present application is of an outer-rotor inner-stator structure. In this case, since a generator rotor is arranged outside, the normal operation of the generator may not be adversely affected in the case that the first lightning current conducting component and the second lightning current conducting component are directly arranged on the outer surface of the generator rotor. Furthermore, the insulated nacelle cover 6 according to the embodiment of the present application is referred to as a nacelle cover having a surface insulated from the second lightning current conducting component 7, the nacelle cover may be made of an insulating material such as nonmetallic material; or may be made of a conductive material such as metal having a surface which is coated with an insulating substance like an insulating varnish layer; or may be made of a conductive substance such as metal, and an insulating support portion is arranged on a part of the nacelle cover to insulate the nacelle cover from the second lightning current conducting component 7. In conclusion, the insulated nacelle cover 6 is not limited by the present application, as long as the nacelle cover can be insulated from the second lightning current conducting component 7.

Thus, the lightning current may be discharged through the separate current conducting channel mentioned in the above effect analysis, rather than being discharged through a structure of the generator system such as the nacelle cover, thereby improving the electrical conductivity of the lightning current discharging channel and protecting the nacelle cover from being damaged by the lightning current. The separate current conducting channel is arranged outside the generator system, which may protect the lightning current from entering into a generator system, thereby preventing the lightning current from interfering a pitch cabinet and surrounding wires inside the generator system. Moreover, it is convenient for an operator to install, repair and maintain the separate current conducting channel.

Figure 3:
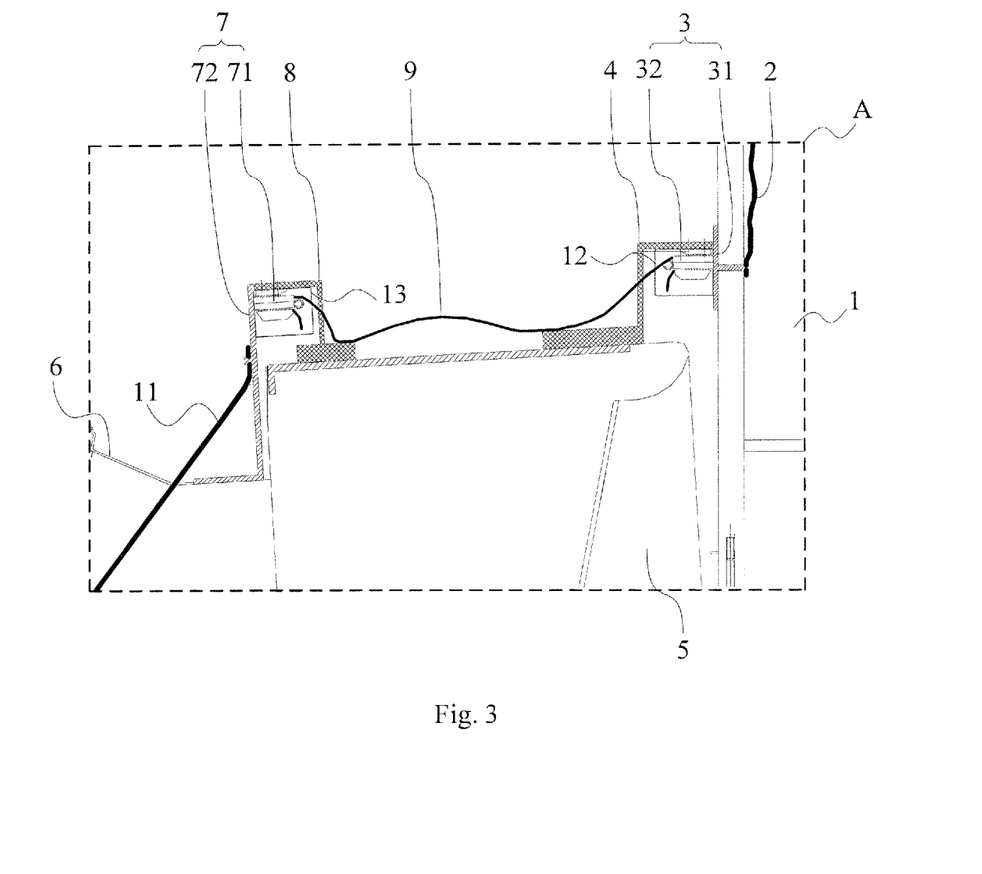
FIG. 3 is a partial enlarged view of a portion A in FIG. 2.

Further, as shown in FIG. 2 and FIG. 3, the lightning protection device according to an embodiment of the present application may further include a first insulating component 4 arranged on the outer surface of the generator rotor 5 and close to the blade 1. The first lightning current conducting component 3 may include a first conducting end and a second conducting end. The first conducting end is arranged at a root of the blade 1 and is electrically connected to the blade down lead 2. The second conducting end is arranged on the first insulating component 4 and is electrically connected to the metal conductor 9. The first conducting end is in sliding contact with the second conducting end in the case that the blade 1 rotates, thereby ensuring that the lightning current can be conducted from the blade down lead 2 to the metal conductor 9 via the first conducting end and the second conducting end.

Specifically, as shown in FIG. 3, the first conducting end may be a metal arc-shaped electric brush track 31 with a preset radian. The second conducting end may be a first lightning protection electric brush 32. Also, a track width of the metal arc-shaped electric brush track 31 is greater than or equal to a length of a long side of a cross section of the first lightning protection electric brush 32. Specifically, the arc-shaped electric brush track 31 may be arranged at a position that is 1.5 meters away from the blade 1 and is at an outer side of the blade 1 and at an trailing edge airfoil of the blade 1, and the preset radian of the arc-shaped electric brush track 31 may be greater than 120 degrees and is preferably within the range from minus 100 degrees to 20 degrees. In this way, no matter the blade 1 rotates around the generator main bearing or rotates under the action of the pitch bearing, the arc-shaped electric brush track 31 can be in an accurate and effective sliding contact with the first lightning protection electric brush 32, thereby ensuring that the lightning current is smoothly conducted from the arc-shaped electric brush track 31 to the first lightning protection electric brush 32. Further, the arc-shaped electric brush track 31 may be pre-embedded in the blade 1 and align to a surface of the blade 1, thereby reducing a forward resistance during the rotating of the blade 1 and improving a generating efficiency of the generator system.

It should be noted that, the arc-shaped electric brush track 31 should be of an appropriate surface roughness to allow a small amount of dust to be generated during sliding friction between the arc-shaped electric brush track 31 and the first lightning protection electric brush 32, and to allow the dust to be filled between the arc-shaped electric brush track 31 and the first lightning protection electric brush 32, thereby ensuring a good electrical conductivity between the arc-shaped electric brush track 31 and the first lightning protection electric brush 32 by the conductivity of the dust. An optimal surface roughness of the arc-shaped electric brush track 31 preferably ranges from Ra8 to Ra12, thus, loss of the first electric brush 32 can be reduced to the largest extent to allow the first electric brush 32 to achieve a long service life, and a good electrical conductivity between the arc-shaped electric brush track 31 and the first lightning protection electric brush 32 can also be ensured.

Further, as an extension and variation embodiment, two groups of first lightning current conducting components 3 and two first insulating components 4 may be further provided according to an embodiment of the present application. As shown in FIG. 3, three groups of first lightning current conducting components 3 and three first insulating components 4 are provided in this embodiment of the present application. The three first lightning protection electric brushes 32 are uniformly distributed at an interval of 120 degrees on the outer surface of the generator rotor 5 via three first insulating components and are close to the blades 1, and the three arc-shaped electric brush tracks 31 are respectively distributed at roots of outer surfaces of the three blades 1. In this way, the three first lightning protection electric brushes 32 are in one-to-one correspondence with the arc-shaped electric brush tracks 31 on the blades 1, thereby effectively conducting the lightning current from the blade down lead 2 to the metal conductor 9.

As shown in FIG. 3, each of the first insulating components 4 may be a support structure which is substantially of a Z shape. The first lightning protection electric brush 32 is arranged at one end, close to the blade 1, of the Z shape of the first insulating component 4, thereby ensuring that the arc-shape electric brush track 31 can just be in sliding contact with the first lightning protection electric brush 32. The first insulating component 4 may be made of an insulating material such as ceramics, high polymer, rubber or nylon.

Further, the first insulating component 4 may be provided with a first electric brush dust receiving box 12 to receive the dust generated during friction process of the first lightning protection electric brush 32 and the arc-shaped electric brush track 31, thereby preventing the dust from entering into the generator and adversely affecting the normal operation of the generator. Specifically, as shown in FIG. 3, the first electric brush dust receiving box 12 is of a box-shape structure, which can completely accommodate the first lightning protection electric brush 32. A small hole is provided in a right lateral surface in contact with the blade 1, of the box-shape structure, which may allow the first lightning protection electric brush 32 to be exposed to be in a sliding contact with the arc-shaped electric brush track 31. A small hole is provided in a left lateral surface of the box-shaped structure, which may allow the metal conductor 9 to pass. In this way, the dust is effectively sealed inside the box-shaped structure, and a lateral face of the first electric brush dust receiving box 12 is openable, thus facilitating changing the first lightning protection electric brush 32.

In the embodiment of the present application in FIG. 2 and FIG. 3, the lightning protection device for the direct-driven wind turbine generator system further includes a second insulating component 8 arranged on the outer surface of the generator rotor 5 and close to the nacelle. The second lightning current conducting component 7 includes a third conducting end and a fourth conducting end. The third conducting end is arranged on the second insulating component 8 and is electrically connected to the metal conductor 9, and the fourth conducting end is arranged on the insulated nacelle cover 6 and is electrically connected to the lightning protection down lead 11. In this way, the third conducting end is in sliding contact with the fourth conducting end in the case that the generator rotor 4 rotates, thereby conducting the lightning current from the metal conductor 9 to the lightning protection down lead 11 via the third conducting end and fourth conducting end.

Specifically, as shown in FIG. 3, the third conducting end may be a second lightning protection electric brush 71, the fourth conducting end may be a metal annular electric brush track 72 encircling the insulated nacelle cover 6, and a track width of the metal annular electric brush track 72 is greater than or equal to a length of, a long side of a cross section of the second lightning protection electric brush 71. Besides, as an extension and variation embodiment, three second lightning protection electric brushes 71 may be arranged, and the three second lightning protection electric brushes 71 are uniformly distributed at an interval of 120 degrees on the outer surface of the generator rotor and close to the insulated nacelle cover 6. Preferably, the three first lightning protection electric brushes 32 have a one-to-one correspondence with the three second lightning protection electric brushes 71. Connection lines between the first lightning protection electric brushes 32 and the corresponding second lightning protection electric brushes 71 are parallel to each other.

With the structure design of three first lightning protection electric brushes 32 and three second lightning protection electric brushes 71, a 360-degree lightning protection effect for the direct-driven wind turbine generator system can be achieved, thereby achieving a full-angle and all-direction lightning protection, enhancing a lightning protection performance of the direct-driven wind turbine generator system, and further ensuring a safe operation of direct-driven wind turbine generator system in a lightning and thunder condition.

Moreover, since the three first lightning protection electric brushes 32 have a one-to-one correspondence with the three second lightning protection electric brushes 71, and the connection lines between the first lightning protection electric brushes 32 and the corresponding second lightning protection electric brushes 71 are parallel to each other, a length of the metal conductor 9 between the first lightning protection electric brush 32 and the second lightning protection electric brush 71 may be minimized, thereby facilitating conduction and conducting the lightning current.

The second insulating component 8 may be a support type structure which is substantially of a Z shape, and the second lightning protection electric brush 71 is arranged at one end, close to the insulated nacelle cover 6, of the Z shape of the second insulating component 8. The second insulating component 8 may be made of an insulating material such as ceramics, high polymer, rubber or nylon. In addition, the second insulating component 8 may be provided with a second electric brush dust receiving box 13 having the same effect and structure as the first electric brush dust receiving box 12, which is not described in detail hereinafter.

In order to ensure the reliable sliding contact between the annular electric brush track 72 and the second lightning protection electric brush 71, the annular electric brush track 72 may be arranged above the outer surface of the generator rotor 5 by a predetermined height, for example, the predetermined height ranges from 300 millimeters to 350 millimeters, and the predetermined height is preferably 320 millimeters. As is similar to the arc-shaped electric brush track 31, a surface roughness of the annular electric brush track 72 may preferably ranges Ra8 to Ra12, and is preferably Ra10.

In the embodiment, the metal conductor 9 between the first lightning protection electric brush 32 and the second lightning protection electric brush 71 is fixed on a base of the first insulating component 4 and a base of the second insulating component 8 by a fixture (not shown), thereby preventing the metal conductor 9 from being broken by continuous swing caused by the rotating of the generator rotor 5.

Figure 4:
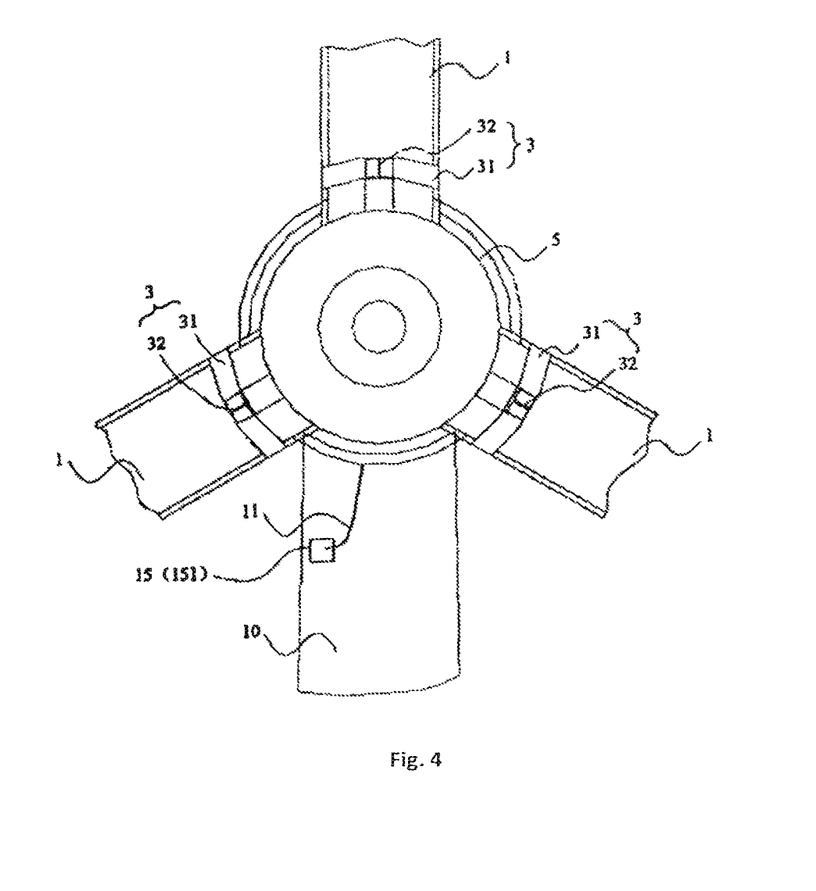
FIG. 4 is a front view of the lightning protection device in FIG. 2.

As shown in FIG. 3 and FIG. 4, the lightning protection down lead 11 connecting the fourth conducting end and a grounding component 15 may bypass a yaw bearing 14 in a cable-twisting way, to prevent the lightning protection down lead 11 from breaking in the case that the generator rotates under the action of the yaw bearing 14.

In the case that the generator rotates clockwise or anticlockwise by a certain angle under the action of the yaw bearing 14, the lightning protection down lead 11 may be twisted by the same angle as the generator rotates. Therefore, the lightning protection down lead 11 is a twist-resistant cable with an enough length, which does not break even in case of being twisted with a maximal angle (generally 720 degrees in the clockwise direction or 720 degrees in the anticlockwise direction). The way, in which the lightning protection down-lead 11 has the enough length to ensure that the lightning protection down-lead 11 does not break in case of being twisted with the maximal angle, is referred to as the cable-twisting way.

Specifically, as shown in FIG. 4, the grounding component 15 may be a grounding ear plate arranged on an inner wall of the tower 10 and electrically connected to a wind turbine base (not shown). In this case, a lightning current discharging channel of the lightning protection device for the direct-driven wind turbine generator system according to the embodiment of the present application is from the lightning arrester, through the blade down lead 2, the arc-shaped electric brush track 31, the first lightning protection electric brush 32, the second lightning protection electric brush 71, the annular electric brush track 72, the lightning protection down lead 11, the grounding ear plate 151, and the wind turbine base, to the ground. Or, the grounding component 15 may be the wind turbine base, and the lightning protection down lead 11 passes through the tower 10 to be directly electrically connected to the wind turbine base, in this way, a lightning current discharging channel of the lightning protection device for the direct-driven wind turbine generator system constructed according to the embodiment of the present application is from the lightning arrester, through the blade down lead 2, the arc-shaped electric brush track 31, the first lightning protection electric brush 32, the second lightning protection electric brush 71, the annular electric brush track 72, the lightning protection down lead 11 and the wind turbine base, to the ground.

It should be noted that, in the embodiment of the present application, the metal conductor 9 and the lightning protection down lead 11 have enough conductive ability to ensure successful conduction of the lightning current. For example, the metal conductor 9 and the lightning protection down lead 11 may be made of a soft copper cable having a cross-sectional area greater than or equal to 50 square millimeters. The soft copper cable having the cross-sectional area no less than 70 square millimeters may be selected to further ensure the conductive ability of the metal conductor 9 and the lightning protection down-lead 11. Of course, a conducting wire having a strong conductive ability such as a copper braided strap or a galvanized flat steel and having the cross-sectional area no less than 70 square millimeters may also be adopted. The metal conductor 9 and the lightning protection down-lead 11 are not limited thereto, as long as the metal conductor 9 and the lightning protection down-lead 11 are made of a metal material having a good conductive ability.

In the above embodiment, the first conducting end is embodied as the arc-shaped electric brush track, and the second conducting end is embodied as the first lightning protection electric brush. In another embodiment of the present application, the arc-shaped electric brush track and the first lightning protection electric brush may be transposed, that is, the first conducting end is embodied as the first lightning protection electric brush, and the second conducting end is embodied as the arc-shaped electric brush track, which can realize the same technical effects, thus is not described in detail hereinafter. Correspondingly, the annular electric brush track and the second lightning protection electric brush may also be transposed, that is, the third conducting end is embodied as the annular electric brush track, and the fourth conducting end is embodied as the second lightning electric brush, which is also not described in detail hereinafter.

It should be noted that, the first lightning protection electric brush and second lightning protection electric brush according to the present application each are a common electric brush. The first lightning protection electric brush and the second lightning protection electric brush are defined just for emphasizing the effects of the electric brushes in the embodiment of the present application and distinguishing positions of the electric brushes. Correspondingly, the arc-shaped electric brush track and the annular electric brush track are tracks matching with the electric brushes, and the arc-shaped electric brush track and the annular electric brush track are defined just for emphasizing the shapes of the tracks.

The above technical solutions according to the embodiments of the present application have the following advantages. Since the separate external current conducting channel design (from the lightning arrester, through the blade down lead, the arc-shaped electric brush track at the root of the outer surface of the wind turbine blade, the first lightning protection electric brush, the second lightning protection electric brush, the annular electric brush track at a side of close to the generator on the top of nacelle cover, the lightning protection down lead, the tower and the wind turbine base, to the ground) is employed in the direct-driven wind turbine generator system, the damage to the bearings of the direct-driven wind turbine generator system caused by the lightning current may be completely avoided, thereby reducing multifunction of the direct-driven wind turbine generator system. The components in the technical solution are electrically connected and are in good contact with each other, there is not any clearance between the component, thereby effectively reducing the impedance of the lightning current discharging channel, and greatly improving the conductivity performance of the direct lightning protection channel. In addition, the first lightning protection electric brush and the second lightning protection electric brush are electrically connected by the soft copper cable, the copper braided strap or the galvanized flat steel, the blade down lead and the lightning protection down lead are made of the soft copper cable, the copper braided strap or the galvanized flat steel having the cross-sectional area no less than 50 square millimeters, thereby greatly improving the conductivity performance of the direct lightning protection channel. Compared with a lightning protection device in which a current conducting channel is provided in the generator system in the conventional technology, the lightning can be prevented from entering into the system to interfere the pitch cabinet and the surrounding wires in the technical solution according to the embodiments of the present application. In the technical solution, the generator dust receiving device is provided at the lightning protection electric brush, thereby preventing the dust generated during friction of the electric brush from entering into the generator.

Correspondingly, a direct-driven wind turbine generator system is further provided according to an embodiment of the present application, which includes a blade, a pitch bearing and a wheel hub connected to the blade, a generator connected to the wheel hub, an insulated nacelle cover connected to the generator, a yaw bearing connected to the insulated nacelle cover, a tower connected to the yaw bearing, and a wind turbine base arranged at a bottom of the tower. In addition, the direct-driven wind turbine generator system further includes any one of the lightning protection devices for the direct-driven wind turbine generator system according to the embodiments of the present application, thus achieving the technical effects described above, and the technical effects of the lightning protection device are described in detail as above, thus are not described again hereinafter.

Figure 5:
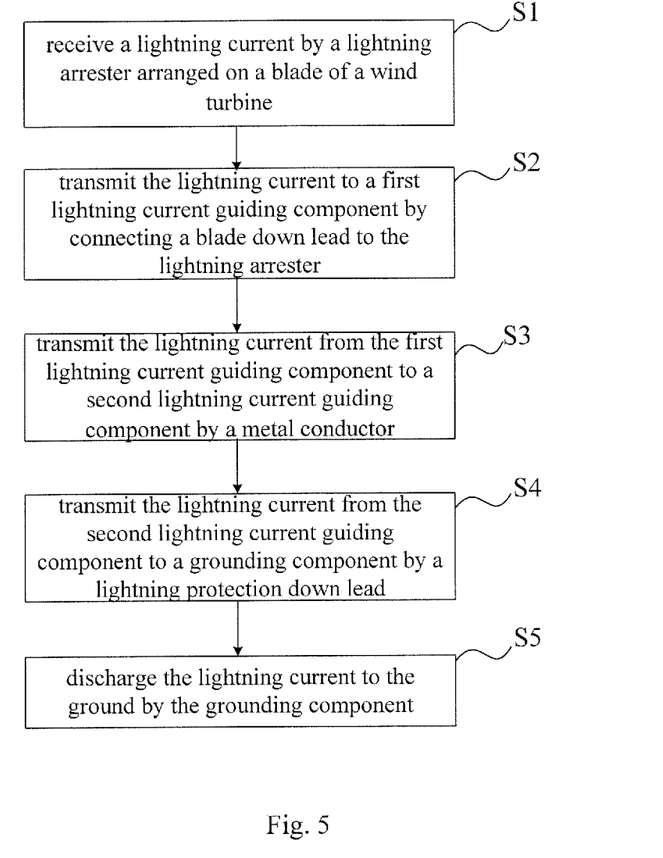
FIG. 5 is a flowchart showing a lightning protection method for a direct-driven wind turbine generator system according to an embodiment of the present application.

Correspondingly, a lightning protection method for a direct-driven wind turbine generator system is further provided according to an embodiment of the present application. A generator of the direct-driven wind turbine generator system is arranged outside of a nacelle, and the direct-driven wind turbine generator system has any one of the lightning protection devices according to the embodiments of the present application. As shown in FIG. 5, the lightning protection method for the direct-driven wind turbine generator system includes the following steps:

S1: receiving a lightning current via a lightning arrester arranged on a wind turbine blade;

S2: transmitting the lightning current to the first lightning current conducting component by connecting the blade down lead to the lightning arrester;

S3: transmitting the lightning current from the first lightning current conducting component to the second lightning current conducting component via the metal conductor;

S4: transmitting the lightning current from the second lightning current conducting component to the grounding component via the lightning protection down lead; and S5: discharging the lightning current into ground by the grounding component.

In the lightning protection method for the direct-driven wind turbine generator system according to the embodiment of the present application, the first lightning current conducting component includes a first conducting end and a second conducting end. The first conducting end is arranged at the root of the blade and electrically connected to the blade down lead. The second conducting end is arranged at a position close to the blade on an outer surface of the generator rotor, is insulated from the generator rotor, and is electrically connected to the metal conductor. The first conducting end is in sliding contact with the second conducting end in the case that the blade rotates. The second lightning current conducting component includes a third conducting end and a fourth conducting end. The third conducting end is arranged at a position close to the insulated nacelle cover on the outer surface of the generator rotor, is insulated from the generator, and is electrically connected to the metal conductor. The fourth conducting end is arranged on the insulated nacelle cover and is electrically connected to the lightning protection down lead. The third conducting end is in sliding contact with the fourth conducting end in the case that the generator rotor rotates.

Therefore, the lightning protection method for the direct-driven wind turbine generator system according to the embodiment of the present application specifically includes:

S1: receiving the lightning current by the lightning arrester arranged on the wind turbine blade;

S21: transmitting the lightning current to the first conducting end by connecting the blade down lead to the lightning arrester;

S22: transmitting the lightning current to the second conducting end via the sliding contact between the first conducting end and the second conducting end contact;

S31: transmitting the lightning current to the third conducting end by the metal conductor between the second conducting end and the third conducting end;

S32: transmitting the lightning current to the fourth conducting end through the sliding contact between the third conducting end and the fourth conducting end;

S41: transmitting the lightning current from the fourth conducting end to the grounding component via the lightning protection down lead; and S51: discharging the lightning current into the ground by the grounding component.

In the lightning protection method for the direct-driven wind turbine generator system according to the present application, the lightning protection device further includes a first insulating component and a second insulating component, the first conducting end is a metal arc-shaped electric brush track having a preset radian, and the second conducting end is a first lightning protection electric brush; the third conducting end is a second lightning protection electric brush, and the fourth conducting end is a metal annular electric brush track encircling the insulated nacelle cover; and the lightning protection method for the direct-driven wind turbine generator system may further include the following steps:

arranging the second conducting end at the position close to the blade on the outer surface of the generator rotor and insulating the second conducting end from the generator rotor described above includes: realizing insulation between the first lightning protection electric brush and the generator rotor by fixing the first insulating component at a side close to the blade on the outer surface of the generator rotor and fixing the first lightning protection electric brush on the first insulating component.

arranging the third conducting end at the position close to the insulated nacelle cover on the outer surface of the generator rotor and insulating the third conducting end from the generator described above includes: insulating the second lightning protection electric brush from the generator rotor by fixing the second insulating component at a side close to the insulated nacelle cover on the outer surface of the generator rotor and fixing the second lightning protection electric brush on the second insulating component.

In the lightning protection method for the direct-driven wind turbine generator system, the lightning protection device further includes a first electric brush dust receiving box and a second electric brush dust receiving box; and the lightning protection method for the direct-driven wind turbine generator system may further include:

receiving dust generated by friction of the first lightning protection electric brush by fixing the first electric brush dust receiving box on the first insulating component; and receiving dust generated by friction of the second lightning protection electric brush by fixing the second electric brush dust receiving box on the second insulating component.

The lightning protection method for the direct-driven wind turbine generator system further includes:

electrically connecting the first lightning protection electric brush and the second lightning protection electric brush by a soft copper cable, a copper braided band or a galvanized flat steel.

The above technical solution according to the embodiments of the present application has the following advantages. Since the separate external current conducting channel design (from the lightning arrester, through the blade down lead, the arc-shaped electric brush track at the root of the outer surface of the wind turbine blade, the first lightning protection electric brush, the second lightning protection electric brush, the annular electric brush track at a side close to the generator on the top of the nacelle cover, the lightning protection down lead, the tower and the wind turbine base, to the ground) is constructed in the direct-driven wind turbine generator system, which can completely avoid the bearings of the direct-driven wind turbine generator system from being damaged by lightning current, thereby reducing a multifunction of the direct-driven wind turbine generator system. The components in the technical solution are electrically connected and are in good contact with each other without any space between them, thereby effectively reducing the resistance of the lightning current discharging channel and greatly improving the conductivity performance of the direct lightning protection channel. In addition, the first lightning protection electric brush and the second lightning protection electric brush are electrically connected by a soft copper cable, a copper braided band or a galvanized flat steel. The blade down lead and the lightning protection down lead are made of a soft copper cable, a copper braided band, or a galvanized flat steel which has the cross-sectional area not less than 50 square millimeters, thereby greatly improving the conductivity performance of the direct lightning protection channel. As compared with the lightning protection device in which a current conducting channel is provided inside the generator system according to the conventional technology, in the technical solution according to the embodiments of the present application, a lightning is prevented from entering into the system and then interfering the pitch cabinet and surrounding wires. In the technical solution, a generator dust receiving device is arranged at the lightning protection electric brush, thereby preventing the dusts generated during friction of the electric brush from entering into the generator.

The above descriptions are only embodiments of the present application, and should not be interpreted as a limitation to the protection scope of the present application. Any variations and substitutions which can be easily thought by those skilled in the art within the technical range of the present application are also deemed to fall into the scope of the present application. Therefore, the scope of the present application is defined by the appended claims.

The invention claimed is:

1. A lightning protection device, comprising: a lightning arrester arranged on a nonmetallic blade and configured to receive a lightning current, and a blade down lead electrically connected to the lightning arrester, wherein the lighting protection device further comprises:
   a first lightning current conducting component, electrically connected to the blade down lead and connected to an outer surface of a generator rotor in an insulation manner;
   a second lightning current conducting component, connected to the outer surface of the generator rotor and an insulated nacelle cover in insulation manner, and electrically connected to the first lightning current conducting component via a metal conductor; and
   a lightning protection down lead, configured to electrically connect the second lightning current conducting component to a grounding component arranged inside a tower, to discharge the lightning current to ground through the grounding component; wherein
   the lightning protection device further comprises a first insulating component arranged on the outer surface of the generator rotor and close to the blade; the first lightning current conducting component comprises a first conducting end and a second conducting end, the first conducting end is arranged at a root of the blade and is electrically connected to the blade down lead, the second conducting end is arranged on the first insulating component and electrically connected to the metal conductor, and the first conducting end is in a sliding contact with the second conducting end during the rotation of the blade;
   the first conducting end is an arc-shaped electric brush track, and the second conducting end is a first lightning protection electric brush; and
   wherein the third conducting end is one of a second lightning protection electric brush and a metal annular electric brush track encircling the insulated nacelle cover, and the fourth conducting end is the other one of second lightning protection electric brush and the metal annular electric brush track encircling the insulated nacelle cover; and
   a surface roughness of the metal arc-shaped electric brush track or the metal annular electric brush track ranges from Ra8 to Ra12.

2. The lightning protection device according to claim 1, wherein the lightning protection device further comprises a second insulating component arranged on the outer surface of the generator rotor and close to the insulated nacelle cover; and
   the second lightning current conducting component comprises a third conducting end and a fourth conducting end, the third conducting end is arranged on the second insulating component and is electrically connected to the metal conductor, the fourth conducting end is arranged on the insulated nacelle cover and is electrically connected to the lightning protection down lead, and the third conducting end is in a sliding contact with the fourth conducting end during the rotation of the generator rotor.

3. The lightning protection device according to claim 1, wherein the lightning protection device further comprises a first electric brush dust receiving box arranged on the first insulating component and configured to receive dust generated during friction process of the first lightning protection electric brush and the metal arc-shaped electric brush track.

4. The lightning protection device according to claim 1, wherein the lightning protection device further comprises a second electric brush dust receiving box arranged on the second insulating component and configured to receive dust generated during friction process of the second lightning protection electric brush and the metal annular electric brush track.

5. The lightning protection device according to claim 1, wherein the preset radian of the arc-shaped electric brush track is at least 120 degrees.

6. The lightning protection device according to claim 1, wherein the lightning protection down lead bypasses a yaw bearing in a cable-twisting way.

7. The lightning protection device according to claim 1, wherein the metal conductor and the lightning protection down lead each are made of a soft copper cable, a copper braided strap or a galvanized flat steel.

8. The lightning protection device according to claim 1, wherein the grounding component is a grounding ear plate arranged at an inner wall of the tower and electrically connected to a wind turbine base; or, the grounding component is the wind turbine base, and the lightning protection down lead is directly electrically connected to the wind turbine base through the tower.

9. The lightning protection device according to claim 1, wherein the lightning protection device additionally comprises two groups of first lightning current conducting components, two first insulating components, two second lightning protection electric brushes and two second insulating components, wherein
   the three first lightning protection electric brushes are uniformly distributed, via the three first insulating components respectively, on the outer surface of the generator rotor at an interval of 120 degrees and close to the blade;
   the three arc-shaped electric tracks are distributed at roots of outer surfaces of three blades respectively; and
   the three second lightning protection electric brushes are uniformly distributed, via three second insulating components respectively, on the outer surface of the generator rotor at an interval of 120 degrees and close to the insulated nacelle cover.

10. The lightning protection device according to claim 9, wherein the three first lightning protection electric brushes have a one-to-one correspondence with the three second lightning protection electric brushes, and connection lines between the first lightning protection electric brushes and the corresponding second lightning protection electric brushes are parallel to each other.

11. The lightning protection device according to claim 1, wherein the metal conductor between the first lightning protection electric brush and the second lightning protection electric brush is fixed on a base of the first insulating component and a base of the second insulating component by a fixture respectively.

12. A direct-driven wind turbine generator system, wherein the direct-driven wind turbine generator system comprises the lightning protection device according to claim 1.

13. A lightning protection method for a direct-driven wind turbine generator system, wherein a generator of the direct-driven wind turbine generator system is arranged at an outside of a nacelle, the direct-driven wind turbine generator system comprises the lightning protection device according to claim 1, and the lightning protection method for the direct-driven wind turbine generator system comprises:
   receiving a lightning current via the lightning arrester arranged on a blade of a wind turbine;
   transmitting the lightning current to the first lightning current conducting component by connecting the blade down lead to the lightning arrester;
   transmitting the lightning current from the first lightning current conducting component to the second lightning current conducting component via the metal conductor;
   transmitting the lightning current from the second lightning current conducting component to the grounding component via the lightning protection down lead; and
   discharging the lightning current to ground via the grounding component.

* * * * *